(12) United States Patent
Kunkel et al.

(10) Patent No.: US 9,819,974 B2
(45) Date of Patent: Nov. 14, 2017

(54) IMAGE METADATA CREATION FOR IMPROVED IMAGE PROCESSING AND CONTENT DELIVERY

(71) Applicant: Dolby Laboratories Licensing Corporation, San Francisco, CA (US)

(72) Inventors: Timo Kunkel, Oakland, CA (US); Anders Ballestad, Vancouver (CA); Joel N. Geddert, Victoria (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/372,747

(22) PCT Filed: Feb. 26, 2013

(86) PCT No.: PCT/US2013/027814
§ 371 (c)(1),
(2) Date: Jul. 16, 2014

(87) PCT Pub. No.: WO2013/130478
PCT Pub. Date: Sep. 6, 2013

(65) Prior Publication Data
US 2015/0007243 A1    Jan. 1, 2015

Related U.S. Application Data

(60) Provisional application No. 61/605,027, filed on Feb. 29, 2012.

(51) Int. Cl.
*H04N 7/173* (2011.01)
*H04N 21/235* (2011.01)
(Continued)

(52) U.S. Cl.
CPC ... *H04N 21/2353* (2013.01); *H04N 21/23418* (2013.01); *H04N 21/234327* (2013.01);
(Continued)

(58) Field of Classification Search
CPC .......... H04N 21/235; H04N 21/23418; H04N 21/2541; H04N 21/28525; H04N 21/84; H04N 21/25825
(Continued)

(56) References Cited

U.S. PATENT DOCUMENTS 5,657,402 A * 8/1997 Bender ................. G06T 3/4038
348/218.1
6,282,299 B1   8/2001 Tewfik
(Continued)

FOREIGN PATENT DOCUMENTS

CA  WO 2012012489 A2 *  1/2012  .......... G06F 3/1462
CN         1756334          4/2006
(Continued)

OTHER PUBLICATIONS

Burt, P.J. et al. "The Laplacian Pyramid as a Compact Image Code" IEEE Transactions on Communications, vol. COM-3I, No. 4, Apr. 1983.
(Continued)

*Primary Examiner* — James R Sheleheda

(57) ABSTRACT

Several embodiments of a media processor for the creation of metadata from a set of images are given. The media processor receives a set of image data and computes metadata from the image data. The metadata may comprise statistical data based on the image data; from which the media processor may generate and store a multi-scale version of the metadata. The metadata may comprise statistical attributes derived directly from the image data or statistical attributes derived from image appearance correlates of the image data. The media processor may generate a subsampled set of the metadata and the subsampled set may be stored in an efficient data structure, such as a pyramidal structure. The pyramidal structure may be generated from
(Continued)

spatial image information, from temporal image information or from spatial-temporal image information.

20 Claims, 10 Drawing Sheets

(51) Int. Cl.
    *H04N 21/2343* (2011.01)
    *H04N 21/81* (2011.01)
    *H04N 21/835* (2011.01)
    *H04N 21/84* (2011.01)
    *H04N 21/234* (2011.01)
    *H04N 21/254* (2011.01)
    *H04N 21/258* (2011.01)

(52) U.S. Cl.
    CPC ... *H04N 21/2541* (2013.01); *H04N 21/25825* (2013.01); *H04N 21/8133* (2013.01); *H04N 21/835* (2013.01); *H04N 21/84* (2013.01)

(58) Field of Classification Search
    USPC .............................................. 725/22, 25, 116
    See application file for complete search history.

(56) References Cited

U.S. PATENT DOCUMENTS

| | | | |
|---|---|---|---|
| 7,949,186 B2* | 5/2011 | Grauman | G06K 9/4671 382/159 |
| 8,184,919 B2 | 5/2012 | Ward | |
| 8,289,412 B2 | 10/2012 | Banterle | |
| 8,401,370 B2 | 3/2013 | Dougherty | |
| 8,417,050 B2* | 4/2013 | Kisilev | G06T 5/004 382/254 |
| 8,525,933 B2 | 9/2013 | Atkins | |
| 8,743,178 B2 | 6/2014 | Filippini | |
| 8,989,519 B2* | 3/2015 | Irani | G06T 3/4053 345/660 |
| 2002/0033844 A1 | 3/2002 | Levy | |
| 2002/0112171 A1 | 8/2002 | Ginter | |
| 2003/0037010 A1 | 2/2003 | Schmelzer | |
| 2003/0046244 A1 | 3/2003 | Shear | |
| 2004/0125148 A1 | 7/2004 | Pea | |
| 2004/0234159 A1* | 11/2004 | Wang | G06K 9/4609 382/260 |
| 2005/0234901 A1* | 10/2005 | Caruso | G06F 17/3002 |
| 2006/0020597 A1* | 1/2006 | Keating | G06F 17/3025 |
| 2006/0215934 A1* | 9/2006 | Peleg | G06T 7/269 382/294 |
| 2007/0073626 A1 | 3/2007 | Reeder | |
| 2007/0217676 A1* | 9/2007 | Grauman | G06K 9/4671 382/170 |
| 2008/0159403 A1* | 7/2008 | Dunning | 375/240.21 |
| 2008/0189283 A1 | 8/2008 | Quoc | |
| 2008/0208828 A1* | 8/2008 | Boiman | G06K 9/00342 |
| 2008/0240490 A1 | 10/2008 | Finkelstein | |
| 2009/0086816 A1 | 4/2009 | Leontaris | |
| 2009/0115901 A1* | 5/2009 | Winter | H04N 5/262 348/565 |
| 2009/0300692 A1* | 12/2009 | Mavlankar | H04N 21/234318 725/94 |
| 2010/0046842 A1 | 2/2010 | Conwell | |
| 2010/0049711 A1* | 2/2010 | Singh | G06F 17/30781 707/758 |
| 2010/0124383 A1* | 5/2010 | Wang | G06T 3/4053 382/299 |
| 2010/0177955 A1* | 7/2010 | Simakov | G06F 17/30843 382/154 |
| 2010/0191722 A1* | 7/2010 | Boiman | G06F 17/30787 707/723 |
| 2010/0211794 A1* | 8/2010 | Bilobrov | 713/176 |
| 2010/0231603 A1 | 9/2010 | Kang | |
| 2010/0262488 A1* | 10/2010 | Harrison | G06Q 30/02 705/14.46 |
| 2010/0303348 A1* | 12/2010 | Tolliver | G06T 7/90 382/164 |
| 2011/0019909 A1* | 1/2011 | Farid | G06K 9/6234 382/160 |
| 2011/0035382 A1 | 2/2011 | Bauer | |
| 2011/0164113 A1 | 7/2011 | Pahalawatta | |
| 2011/0164677 A1 | 7/2011 | Liu | |
| 2011/0188742 A1* | 8/2011 | Yu | G06K 9/6218 382/159 |
| 2011/0194618 A1 | 8/2011 | Gish | |
| 2011/0216937 A1 | 9/2011 | Radhakrishnan | |
| 2011/0219097 A1 | 9/2011 | Crockett | |
| 2011/0231882 A1 | 9/2011 | Wang | |
| 2011/0305391 A1 | 12/2011 | Kunkel | |
| 2012/0027079 A1 | 2/2012 | Ye | |
| 2012/0030316 A1 | 2/2012 | Dougherty | |
| 2012/0038782 A1 | 2/2012 | Messmer | |
| 2012/0086850 A1* | 4/2012 | Irani | G06T 3/4053 348/441 |
| 2012/0179742 A1* | 7/2012 | Acharya | H04N 7/18 709/202 |
| 2012/0281923 A1* | 11/2012 | Irani | G06K 9/6223 382/218 |
| 2013/0058588 A1* | 3/2013 | Wang | G06T 5/003 382/255 |
| 2013/0129142 A1* | 5/2013 | Miranda-Steiner | G06K 9/00664 382/103 |
| 2013/0163864 A1* | 6/2013 | Cavet | G06F 17/30802 382/165 |
| 2013/0259361 A1* | 10/2013 | Singh | G06F 17/30781 382/154 |
| 2014/0177706 A1* | 6/2014 | Fernandes et al. | 375/240.03 |
| 2014/0321746 A9* | 10/2014 | Dunlop | G06K 9/00684 382/173 |
| 2015/0046537 A1* | 2/2015 | Rakib | G06F 17/3082 709/204 |
| 2015/0125036 A1* | 5/2015 | Bilobrov | G06K 9/00067 382/103 |
| 2015/0162013 A1* | 6/2015 | Sharma | G10L 19/018 700/94 |
| 2015/0169638 A1* | 6/2015 | Jaber | G06F 17/30259 707/749 |
| 2016/0249093 A1* | 8/2016 | Stojancic | H04N 1/32 |
| 2016/0267079 A1* | 9/2016 | Ramanathan | G06F 17/30799 |
| 2016/0307037 A1* | 10/2016 | Stojancic | G06K 9/00744 |

FOREIGN PATENT DOCUMENTS

| | | |
|---|---|---|
| EP | 1496701 | 1/2005 |
| GB | 2370932 | 7/2002 |
| JP | 2004-198479 | 7/2004 |
| JP | 2010-525634 | 7/2010 |
| JP | 2011-520162 | 7/2011 |
| WO | 01/52178 | 7/2001 |
| WO | 2007/009876 | 1/2007 |
| WO | WO 2011106247 A2 * | 9/2011 |

OTHER PUBLICATIONS

Adelson, E.H. et al "Pyramid Methods in Image Processing" RCA Engineer, Nov./Dec. 1984.

Wien, M. et al. "Real-Time System for Adaptive Video Streaming Based on SVC" IEEE Transactions on Circuits and Systems for Video Technology, vol. 17, No. 9, Sep. 2007, pp. 1227-1237.

Pande, Amit "Algorithms and Architectures for Secure Embedded Multimedia Systems" Ph.D. Thesis, Iowa State University, 2010.

Hikal, N. A. et al. "A Method for Digital Image Compression with IDP Decomposition Based on 2D-SOFM VQ" GVIP 05 Conference, Dec. 19-21, 2005, Cairo, Egypt, pp. 155-160.

Pattanaik, S.N. et al "A Multiscale Model of Adaptation and Spatial Vision for Realistic Image Display" SIGGRAPH, Proceedings of the 25th Annual Conference on Computer Graphics and Interactive Techniques, ACM New York, NY, USA, Jun. 1998.

Chen, Jau-Yuen, et al. "Active Browsing with Similarity Pyramids" Conference Record of the Thirty-Second Asilomar Conference on

(56) References Cited

OTHER PUBLICATIONS

Signals, Systems & Computers, Nov. 1998, pp. 248-252, vol. 1, Pacific Grove, CA, USA.
Kandel, A. et al. "Applied Graph Theory in Computer Vision and Pattern Recognition" John Wiley and Sons, Inc. Publication, Mar. 12, 2007, pp. 85.
Hannuksela, Jari "Camera Based Motion Estimation and Recognition for Humancomputer Interaction" Academic Dissertation with the assent of the Faculty of Technology of the University of Oulu, for public defense in Auditorium TS101, Linnanmaa, on Dec. 19, 2008.
Cherkashyn, V. et al. "Image Decomposition on the Basis of an Inverse Pyramid with 3-Layer Neural Networks" Journal of Communication and Computer, USA, Nov. 2009, vol. 6, No. 11, Serial No. 60.
Kountchev, R. et al. "Image Multi-Layer Search Based on Spectrum Pyramid" IEEE International Conference on Information Reuse and Integration, Aug. 13-15, 2007, pp. 436-440.
Salembier, P. et al. "Multimedia Description Schemes" IEEE Transactions on Circuits and Systems for Video Technology, Jun. 2001, vol. 11, Issue 6, pp. 748-759.
Schallauer, P. et al "Automatic Quality Analysis for Film and Video Restoration" International Conference on Image Processing, Sep. 1, 2007, pp. IV-9-IV 12.
Ganesan P. et al. "Exploiting Hierarchical Domain Structure to Compute Similarity" ACM Transactions on Information Systems, vol. 21, No. 1, Jan. 1, 2003.

\* cited by examiner

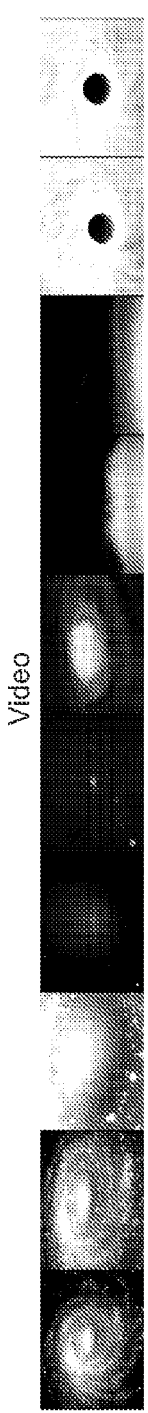
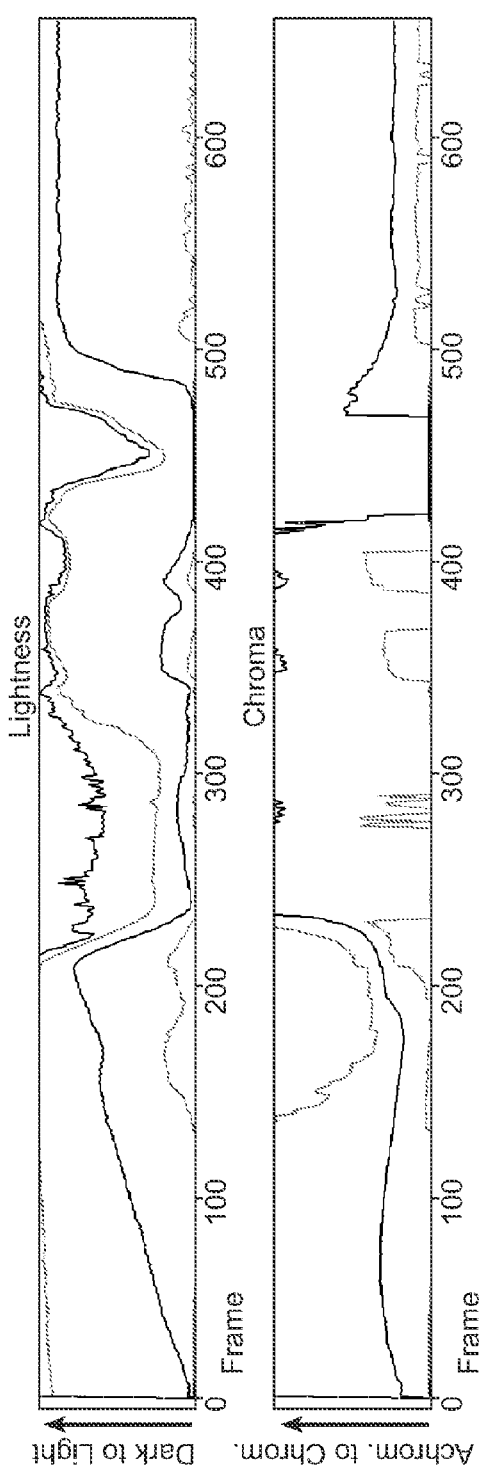
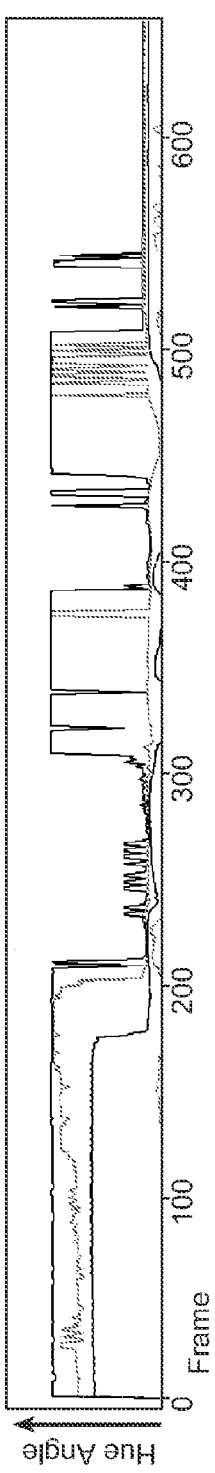
FIG. 6A  FIG. 6B  FIG. 6C  FIG. 6D

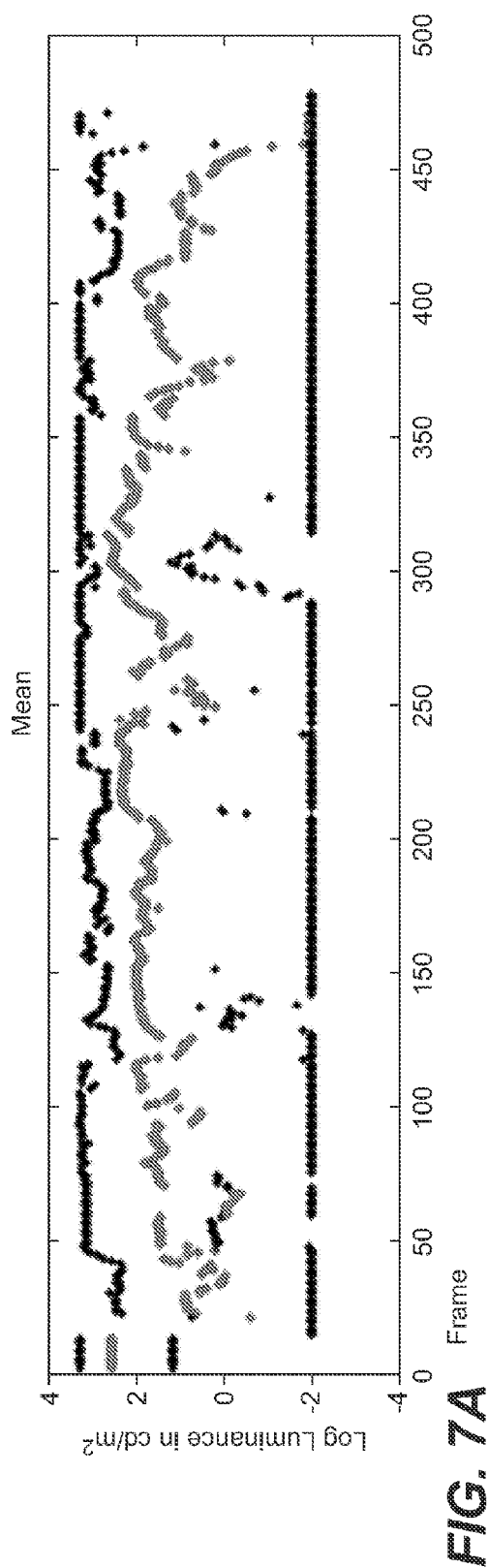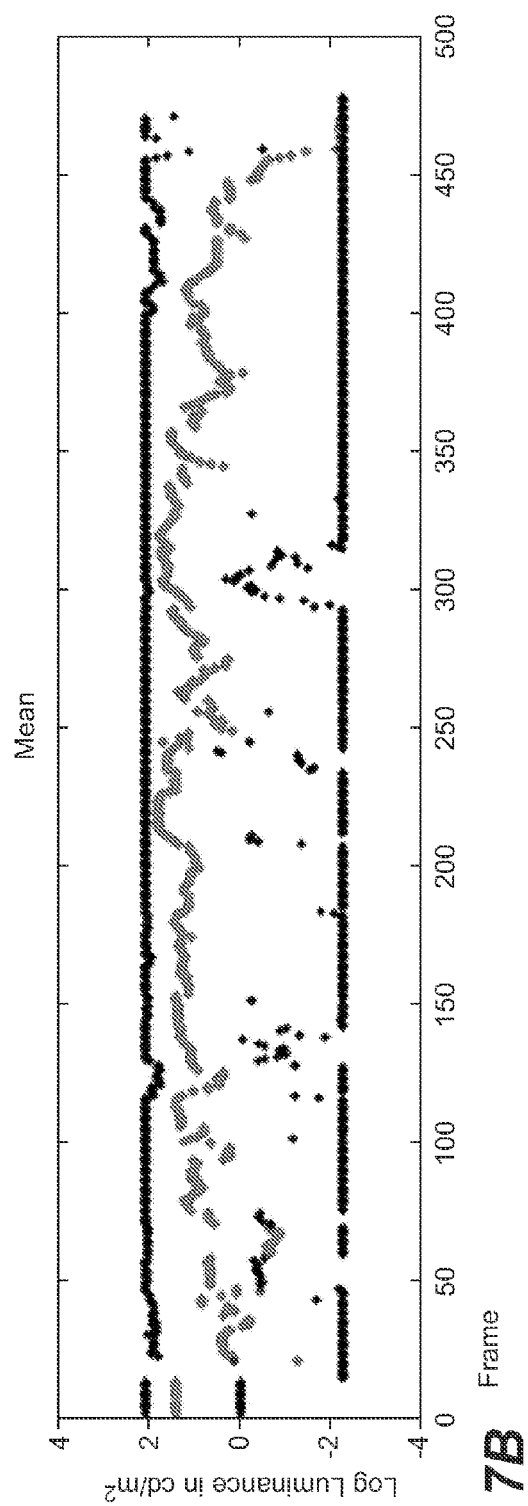

IMAGE METADATA CREATION FOR IMPROVED IMAGE PROCESSING AND CONTENT DELIVERY

CROSS-REFERENCE TO RELATED APPLICATIONS

This application claims the benefit of priority to U.S. Provisional Patent Application Ser. No. 61/605,027 filed on 29 Feb. 2012, hereby incorporated by reference in its entirety.

TECHNICAL FIELD OF THE INVENTION

The present invention relates to image content delivery systems and, more particularly, to novel systems and methods for creating, verifying and/or using metadata within an image content delivery system.

BACKGROUND OF THE INVENTION

It is known to use metadata within a stream of image and/or video data in order to affect different functionality or improve performance. For example, the following co-owned patent applications are given: (1) United States Patent Publication Number 20110035382, entitled "ASSOCIATING INFORMATION WITH MEDIA CONTENT", to Bauer and published Feb. 10, 2011; (2) United States Patent Publication Number 20110164113, entitled "CONVERSION OF INTERLEAVED DATA SETS, INCLUDING CHROMA CORRECTION AND/OR CORRECTION OF CHECKERBOARD INTERLEAVED FORMATTED 3D IMAGES", to Pahalawatta et al. and published on Jul. 7, 2011; (3) United States Patent Publication Number 20110216162, to Filippini et al., published on Sep. 8, 2011 and entitled "MULTI-VIEW VIDEO FORMAT CONTROL"; (4) United States Patent Publication Number 20110219097, to Crockett, published on Sep. 8, 2011 and entitled "TECHNIQUES FOR CLIENT DEVICE DEPENDENT FILTERING OF METADATA"; (5) United States Patent Publication Number 20110222835, to Dougherty et al., published on Sep. 15, 2011 and entitled "APPLICATION TRACKS IN AUDIO/VIDEO CONTAINERS"; (6) United States Patent Publication Number 20120030316, to Dougherty et al., published on Feb. 2, 2012 and entitled "UNIFIED MEDIA CONTENT DIRECTORY SERVICES"; (7) United States Patent Publication Number 20120038782 to Messmer et al., published Feb. 16, 2012 and entitled "VDR METADATA TIMESTAMP TO ENHANCE DATA COHERENCY AND POTENTIAL OF METADATA"—are hereby incorporated in their entirety.

The collection of image statistics—in its wide variety of forms and formats (e.g. histograms, moment invariants, etc.)—in media content to affect processing is described in co-owned: (1) United States Patent Publication Number 20110216937 (the '937 publication), to Radhakrishnan et al., published on Sep. 8, 2011 and entitled "MEDIA FINGERPRINTS THAT RELIABLY CORRESPOND TO MEDIA CONTENT WITH PROJECTION OF MOMENT INVARIANTS"; (2) United States Patent Publication Number 20090086816, to Leontaris et al., published on Apr. 2, 2009 and entitled "VIDEO COMPRESSION AND TRANSMISSION TECHNIQUES"; (3) United States Patent Publication Number 20110164677, to Lu et al., published on Jul. 7, 2011 and entitled "COMPLEXITY ALLOCATION FOR VIDEO AND IMAGE CODING APPLICATIONS"; (4) United States Patent Publication Number 20120027079, to Ye et al., published on Feb. 2, 2012 and entitled "ADAPTIVE INTERPOLATION FILTERS FOR MULTI-LAYERED VIDEO DELIVERY"—and are hereby incorporated by reference in their entirety.

SUMMARY OF THE INVENTION

Several embodiments of display systems and methods of their manufacture and use are herein disclosed.

In several embodiments of a media processor for the creation of metadata from a set of images and/or video is given. The media processor receives a set of image data and computes metadata from the image data. The metadata may comprise statistical data based on the image data; from which the media processor may generate and store a multi-scale version of the metadata. The metadata may comprise statistical attributes derived directly from the image data or statistical attributes, or in some embodiments may be derived from image appearance correlates of the image data. The media processor may generate a subsampled set of the metadata and the subsampled set may be stored in an efficient data structure, such as a pyramidal structure or multi-scale structure. The pyramidal structure may be generated from spatial image information, from temporal image information or from spatial-temporal image information.

In one embodiment, the media processor may further comprises different processor and/or procession functionality such as a DM processor, a DRM processor, a compression processor, a TM processor, a CAM processor, or a Gamut Mapping processor.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 6A through 6D represent image analysis of an exemplar video clip.

FIGS. 7A and 7B represent a set of metadata derived from a video clip, similar to the one shown in FIG. 6A.

DETAILED DESCRIPTION OF THE INVENTION

Figure 1:
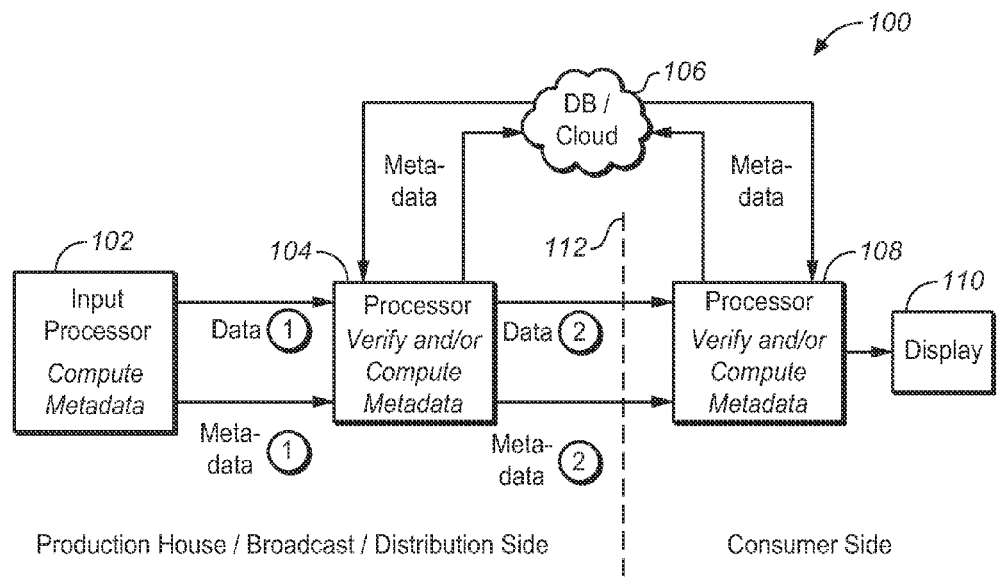
FIG. 1 shows one embodiment of a digital data, image and/or video pipeline system made in accordance with the principles of the present application.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. A component may also be intended to refer to a communications-related entity, either hardware, software (e.g., in execution), and/or firmware and may further comprise sufficient wired or wireless hardware to affect communications.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal (e.g., in one or more of a statistical, biometric or opthamological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'visual dynamic range' or 'variable dynamic range' (VDR) may individually or interchangeably relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth. As used herein, the term 'simultaneous dynamic range' may relate to VDR.

Introduction

As described in the co-owned '937 application, image statistics may be collected from source image data and used to create media "fingerprints" that correlate with the source image data. However, the use of "fingerprints" typically requires manipulation of the video material which alters the source data. This is one known use of image statistics to create metadata from source image data to affect processing. The present application describes novel ways, uses—as well as systems—for creating metadata from statistical analysis of source data (that do not alter the source data) to affect a variety of applications. In addition, the present application employs efficient storage and use of this statistically based metadata that allows a robust set of functionality and use.

FIG. 1 depicts one digital data, image and/or video pipeline system 100 made in accordance with principles of the present application. This invention could potentially fit in a software product to assist in improving the efficiency of other imaging algorithms. Pipeline 100 may comprises an input media processor 102 that may take as input existing image, video, metadata (or a mix of image, video and/or metadata) or other digital data (e.g. source data) and compute a set of metadata that is associated with the source data, as will be discussed further herein.

Such data and metadata may be streamed, communicated (in either a wired or wireless fashion) and/or otherwise sent to a media processor 104 that may take as input either the source data and/or the source data and metadata (either combined in some fashion, or sent separately). Other sources of data and metadata may be made available to media processor 104 via a communications path way 106—which may also comprise a database, either local or on the cloud or made available through networks, such as the Internet. As will be described in greater detail below, this communications pathway 106 may be a stream of information by and/or between media processor 104 and a codec processor (or other suitable processor in the chain) 108 that may send data and/or metadata to a display 110 or the like suitable for rendering an image thereon. It should be appreciated that there may be an unlimited number of media processors (not depicted) sending and receiving data and metadata streams either from each other up and down the pipeline or other data paths such as 106.

It will be appreciated that any suitable pipeline for the purposes of the present application may have a plurality of other processors (not shown) for intermediate processing and/or communications between a suitable media processor and the codec or video processor. It will also be appreciated that dashed line 112 may indicate an imaginary divide between, e.g., a production house, broadcast and/or distribution side of the video pipeline from the consumer side of the video pipeline. In some embodiments, this may also connect one consumer to another consumer. For merely a few examples, video conferencing, social networking image setting transfer (e.g. automatic sharing of 'cool' image presets with others) might be other environments for the application of the present application.

Figure 2:
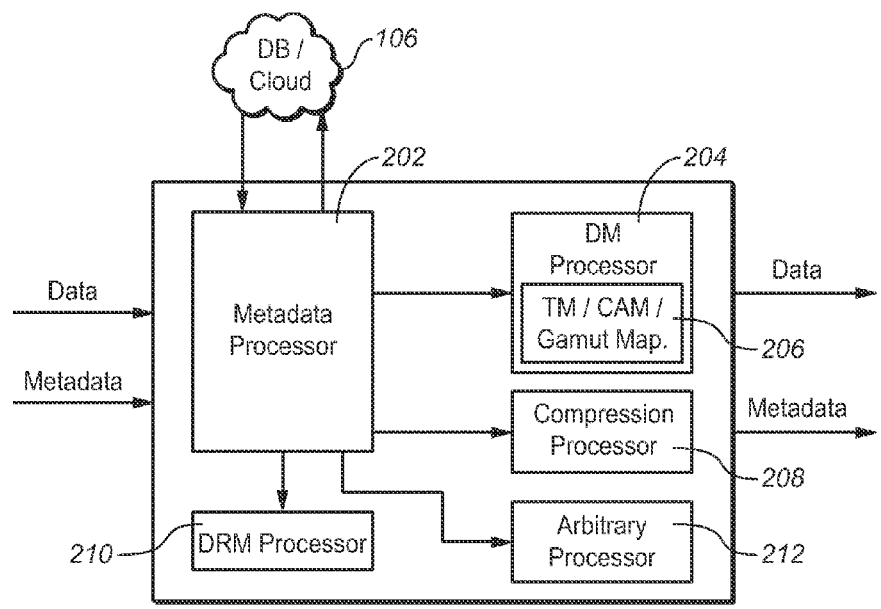
FIG. 2 shows one possible embodiment of a media processor made in accordance with the principles of the present application.

FIG. 2 shows one possible embodiment of a media processor 104 that might suffice for the purposes of the present application. Media processor 104 may input data and/or metadata as previously discussed from another processor or from a communications pathway 106. In any event, source image and/or video data or a combination of source data and metadata is received by media processor 104. Such sets of data may be input into a metadata processor 202—either directly as shown or indirectly via another system architecture. In addition to receiving existing metadata, the media processor may compute a multitude of image, video and data stream related statistics. This newly computed metadata may either be used to verify existing metadata from one of the above described sources and/or be handed over to other applications, to other media processors 104 or to a communication pathway 106.

As will now be discussed, depending on the application of the data/metadata, there may optionally be other system architectural blocks. These other architectural blocks may affect one or more possible processing of data/metadata. In one embodiment, one processor block—e.g. the metadata processor 202—may compute and share the statistics it computes with other processing blocks as may be desired by other blocks and/or other whole media processors. In this fashion, statistics may be computed only once and not multiple times—say, e.g., for the DRM and the TM module. In addition, media processor 202 may comprise at least one other processor.

One possible block may be DM (Display Management) processor 204. DM processor may take the source data and/or metadata that may affect the rendering of the image and/or video data at a downstream media processor or a display device. For example, DM processor 204 may comprise modules and/or methods that affect tone mapping (TM); Color Appearance (CAM) and/or Image Appearance; and/or gamut mapping. Methods of such tone mapping and DM processing may be seen in the following co-owned applications: (1) United States Patent Publication Number 20120026405, by Atkins et al., published on Feb. 2, 2012 and entitled "SYSTEM AND METHOD OF CREATING OR APPROVING MULTIPLE VIDEO STREAMS"; (2) United States Patent Publication Number 20110194758, to WARD, published on Aug. 11, 2011 and entitled "REPRESENTING AND RECONSTRUCTING HIGH DYNAMIC RANGE IMAGES"; (3) United States Patent Publication Number 20110194618, to Gish et al., published on Aug. 11, 2011 and entitled "COMPATIBLE COMPRESSION OF HIGH DYNAMIC RANGE, VISUAL DYNAMIC RANGE, AND WIDE COLOR GAMUT VIDEO"; (4) United States Patent Publication Number 20100208143, to Banterle et al., published on Aug. 19, 2010 and entitled "APPARATUS AND METHODS FOR BOOSTING DYNAMIC RANGE IN DIGITAL IMAGES"; (5) United States Patent Publication Number 20110305391 to Kunkel et al., published Dec. 15, 2011 and entitled "IMAGE PROCESSING AND DISPLAYING METHODS FOR DEVICES THAT IMPLEMENT COLOR APPEARANCE MODELS"; (6) United States Patent Publication Number 20100231603 to Kang, published Sep. 16, 2010 and entitled "ARTIFACT MITIGATION METHOD AND APPARATUS FOR IMAGES GENERATED USING THREE DIMENSIONAL COLOR SYNTHESIS"—all of which are hereby incorporated by reference in their entirety.

Another possible block might be a compression processor 208. Such compression processor 208 may take source data in combination with metadata from metadata processor 202 in such a fashion that a compression algorithm may reduce bandwidth for streaming or distribution in an optimized manner. Such metadata may for example be a description of the input environment or the camera's capabilities. Yet another processor might be a Digital Rights Management (DRM) processor 210 that—e.g., uses the source data based metadata transmitted and/or computed by metadata processor 202 and computes correlative metadata and/or image statistics that uniquely identify source image and/or video data that may be requested by a viewer or third party e.g., a content provider (via pathway 106). Such unique identification may be used to determine whether the requesting viewer has the rights to the data (or view the image and/or video), according to copyrights, licensing, geography or the like. Yet another possible block might be an additional and/or arbitrary processor 212 to help affect the processing of other processor blocks. One possible use of an additional processor may be for the interfacing with social networks (e.g. Facebook, Twitter, etc.) The metadata may be used to efficiently identify and/or "share" media with "friends" or other interested individuals. Once suitable metadata has been created, stored or otherwise managed, media processor may output source and/or metadata into a video pipeline, such as the one previously described. It should be appreciated that these processors blocks—e.g. compression processor, DM processor, DRM processor, among others may be implemented either separately or may be implemented on a single processor (with either dedicated physical circuitry or by different firmware using common circuitry).

Metadata Uses and Creation

The uses of relevant metadata may enable a wide range of functionality to an end-user. For example, the availability of metadata in a video stream can be very useful to help optimize the image fidelity of a film or a video. Alternatively, the right metadata may be useful for the creation and/or enforcement of Digital Rights Management (DRM). However, it can happen that this metadata stream is truncated, thus leaving the content provider with no means of tailoring the video stream for the particular customer, or identifying the particular content in question. In one embodiment, it is possible to analyze a video-stream at the consumer end-point for such a variety of reasons—e.g., (1) adjust it according to Display Management (DM) algorithms for improved image fidelity; (2) compare that data to an available online database for effective "metadata-recovery"; (3) compare metadata derived from the content to an online database for effective DRM-management (which can be provided e.g. by a content provider/studio); or (4) verify that the received, already existing metadata is substantially consistent and correlates well with the source data. These methods may employ metadata "markers". For merely one example, wrong or incorrect metadata may sometimes be submitted along a video stream that does not fit at all or is highly unlikely to be correct—e.g., the metadata might state that a Canon camera was used in combination with a Nikon lens—that is possible, but highly unlikely.

As will be discussed further, such markers may be "statistical attributes" derived directly from the content—or derivative of such content (e.g., "image appearance correlates" such as luminance, chroma, colorfulness, hue, etc.)—that, when combined, may identify—or describe the behavior of—the content to a high degree of certainty. Examples of these markers may include, but are not limited to: (1) statistical moments (e.g., mean, variance, skewness, kurtosis, etc.), min- and max-values; (3) spatial information about the content obtained by for example, histograms, image pyramids, edges and gradients or Fourier analysis or other multi-scale approaches; and (4) framerate, resolution and bit-depth. It should be appreciated that statistics may be employed on any source data or derivatives thereof (e.g., edges, color space transforms, CAMs, timelines, stereoscopic depth (z-values) or multi-scale versions of this source data or its derivatives. Thus, for example, it is possible to have a multi-scale pyramid on the source image derivative 'chroma'.

Once the content is recognized or described, a number of uses can be identified: improved display management, enhanced resolution or bit-depth, DRM-related issues are obvious examples, but the markers may also be used for statistical analysis of the consumer's viewing habits, based on the type of content, time-of-day and seasonal habits.

Figure 3:
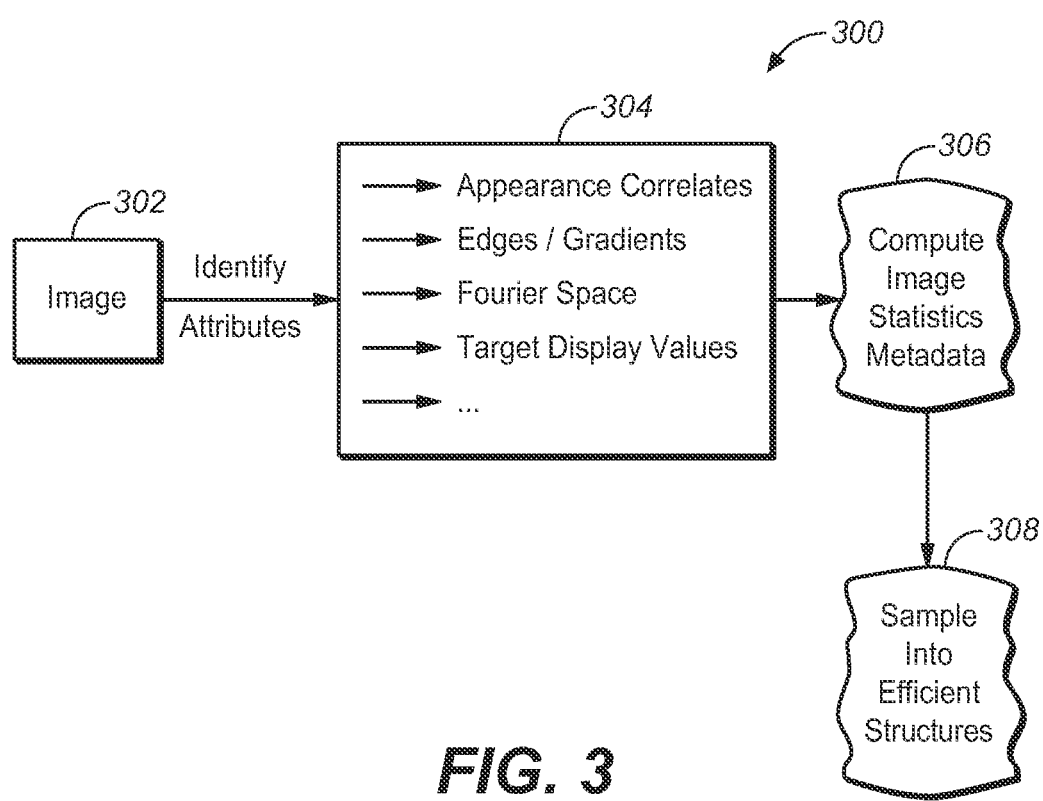
FIG. 3 depicts one possible embodiment of a flowchart for the creation of metadata and the storage of such metadata in efficient data structures.

FIG. 3 depicts one embodiment of a generalized flowchart for the creation of such efficient metadata. It should be appreciated that, depending upon the particular use of the metadata, there will be differences and/or refinements on this flowchart 300. Starting with image (and/or source data) 302, various attributes may be identified in the data. Block 304 gives merely a few of the types of attributes from which image statistics may be derived. Among these attributes, there are: appearance correlates (e.g. brightness, chroma, and hue), edges, gradients, Fourier space frequency analysis (for, e.g. spatial frequency or other measures).

In addition to data based on the source data, other data may be used in the creation of metadata. For example, information regarding the target display(s) may be used. Such target display values may comprise: what display is used and its specifications, its maximum and/or minimum luminance, contrast, gamma value and color gamut. Other target display specifications and values may also be used, such as a descriptor of the display's environment. In addition, it may be possible to use metadata descriptors of the source environment. For example, such metadata might include information about the film set, or the grading room environments, or the specifications of the grading display (which might be of possible interest to the DM module).

Display Management Metadata

Figure 4:
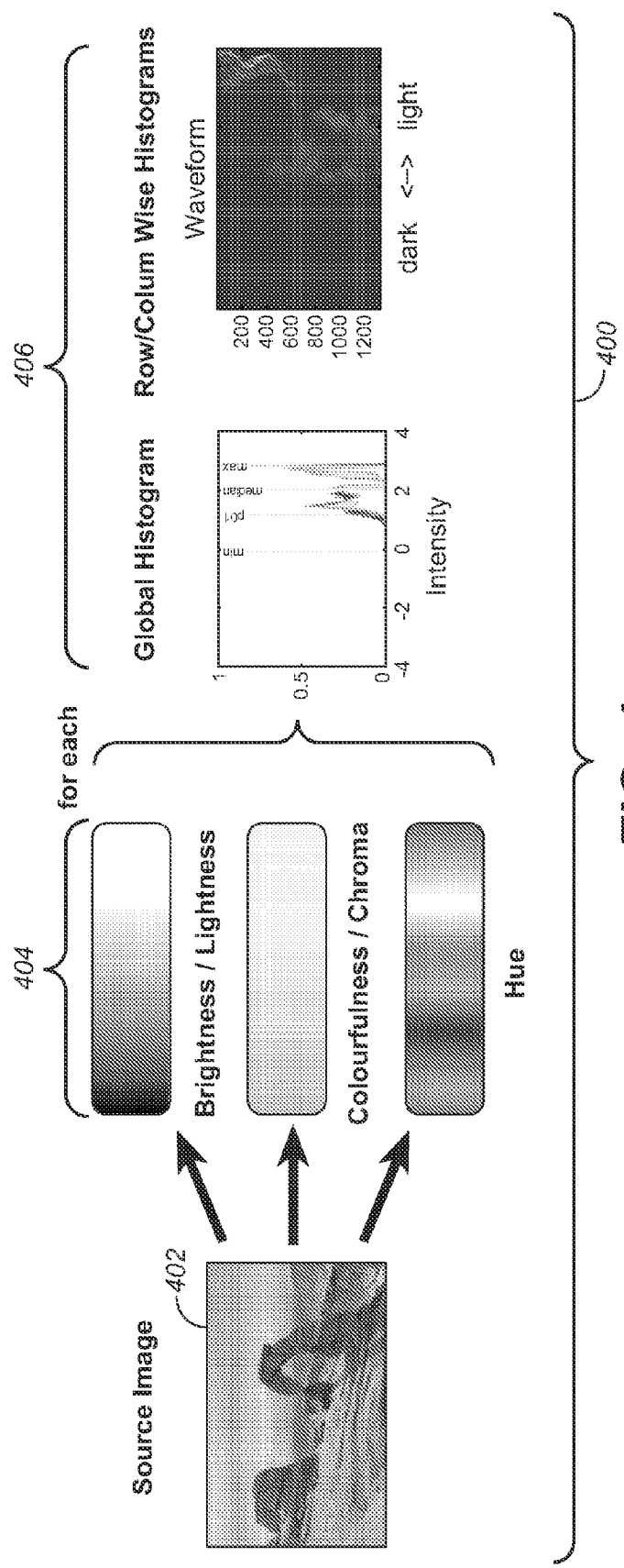
FIG. 4 depicts a set of metadata being derived from a source image and/or source video data.

FIG. 4 depicts one metadata pipeline 400—derivable from source image and/or video data 402. Source data 402 may be analyzed—e.g., as a frame if image data and frame by frame if video data—to extract the data (404) of several metrics, such as brightness, chroma and hue. From this data, it is possible to create individual histograms 406 in various formats—e.g., global histograms or row/column histograms. Alternatively, the input image or video may be spatially subsampled (e.g., multi-scale approach), followed by steps 404 and 406 for each scale layer. It should be appreciated that other formats of histogram metadata may be derived as desired.

Figure 5:
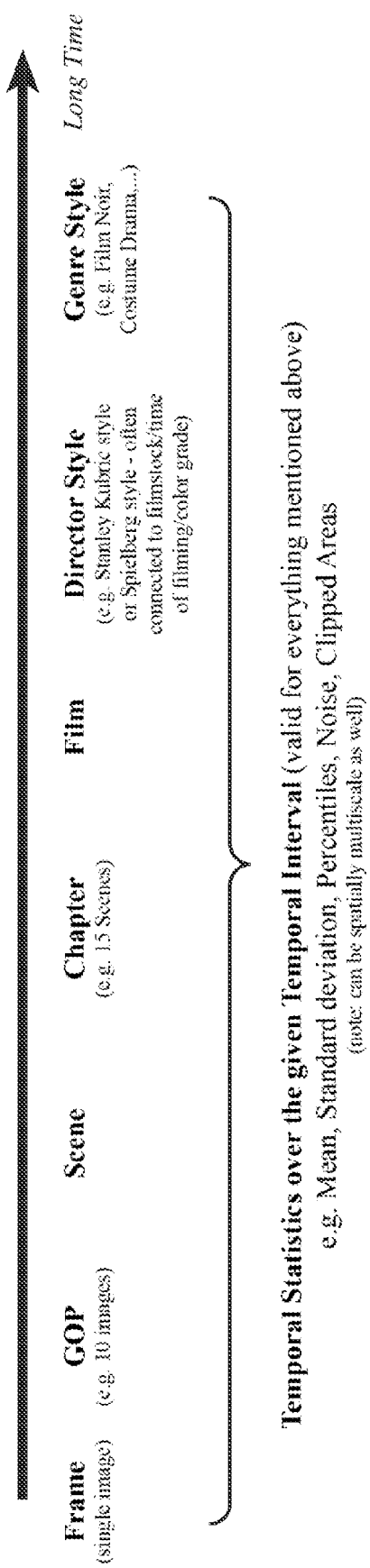
FIG. 5 depicts a range of a possible set of data having a relationship in time from which metadata may be derived having temporal characteristics.

In addition to metadata based on spatial relationships, other forms of metadata may be created that is based on temporal relationship or a combination of spatial and temporal relationships. FIG. 5 depicts a range of possible set of data from which metadata may be derived—with increasing amounts of temporal data consider in its derivation (from left to right). At the leftmost extreme, an individual frame may be examined for metadata. Of course, a single frame is taken at a single point in time—so, temporal data is substantially zero. In one embodiment, each frame was made capturing photons over a certain integration time (e.g. 1/60th of a second for each frame). In photography, this information may be present in the EXIF file. Currently, this is not typically available with film, but such information may be available in the future. The integration time may be able to tell if the captured real scene was light or rather dark.

Next, a Group of Pictures (GOP) may be analyzed (perhaps 5-10 frames of image data), then a scene having more frames (but perhaps sharing a good deal of common brightness, chroma and hue), then a chapter within a film, then the entire film. This may be affected by a multi-scale approach as well.

Over several films, a directorial style may be discerned in the metadata calculated. Over several directors involved in similarly themed pictures, the metadata may be able to discern patterns of a genre style (e.g., vampire movies tend to be of low brightness, high contrast, low chroma or the like). It should be appreciated that temporal metadata may be desirable if the appropriate metric is taken into consideration.

To illustrate some of the embodiments described herein, FIG. 6A is a representation of a video clip of a simulated flight into a galaxy in space. This particular clip may comprise several hundred (e.g. over 500) video frames. FIGS. 6B, 6C and 6D represent the analysis (over time and per frame) of the lightness, chroma and hue data respectively. More particularly, each of FIGS. 6B, 6C and 6D may be read out on a frame-by-frame basis moving across the x-axis. At any given x-coordinate (i.e. at a given frame), the max, min and mean of the metric are shown. With the eye scanning left to right, the viewer may get a sense of how the video is changing with respect to the evolving video. In addition, the input video frames may be sub-sampled (e.g., in a multi-scale approach) before analysis. Also, the timeline may be sub-sampled (e.g., in a multi-scale approach). This may lead to a combined spatial and temporal multi-scale approach.

Depending on the statistics computed from the image, image manipulations are not affecting the identification abilities e.g. cause by color grading (e.g., it is possible to use Bayesian statistics to compare content to reference content). FIGS. 7A and 7B illustrate the statistical similarities between a VDR (i.e., Visual Dynamic Range, or some other enhanced and/or increased dynamic range) and SDR (i.e., as standard dynamic range) grade of a same video clip. FIGS. 7A and 7B show two sets of metadata derived by two different grades of the simulated flight, e.g., as might be depicted similarly in FIG. 6A. FIG. 7A is derived from a grading on a monitor with 4000 cd/m$^2$ max capability (0.01 cd/m$^2$min) and FIG. 7B is derived by a grading on a monitor in CRT mode with 120 cd/m$^2$ max capability (0.005 cd/m$^2$ min). At each frame (e.g. frame 100), a max and min luminance of the frame is denoted, together with the mean luminance within that frame. It should be appreciated that although the dynamic range and thus the grades are different, there is a statistical correlations between the two different gradings of the same video.

Efficient Metadata Structure

From this set of attributes regarding the source data, the target display or some combination of both, metadata may be created. This metadata may rely on some possible image statistics. For example, histogram plots of lightness, chroma and/or hue may be used to derive metadata. At 308, this metadata (possibly together with source data) may be sampled and/or subsampled to be stored into efficient storage or data structures. For merely one example, metadata and/or data may be stored in a pyramidal structure—as described in (1) P. J. BURT and E. H. ADELSON: The Laplacian Pyramid as a Compact Image Code. IEEE Transactions on Communications, Vol. COM-31, No. 4, April 1983 or (2) E. H. Adelson, C. H. Anderson, J. R. Bergen, P. J. Burt, J. M. Ogden: Pyramid methods in image processing. RCA Engineer, 29(6), November/December 1984.

Figure 8:
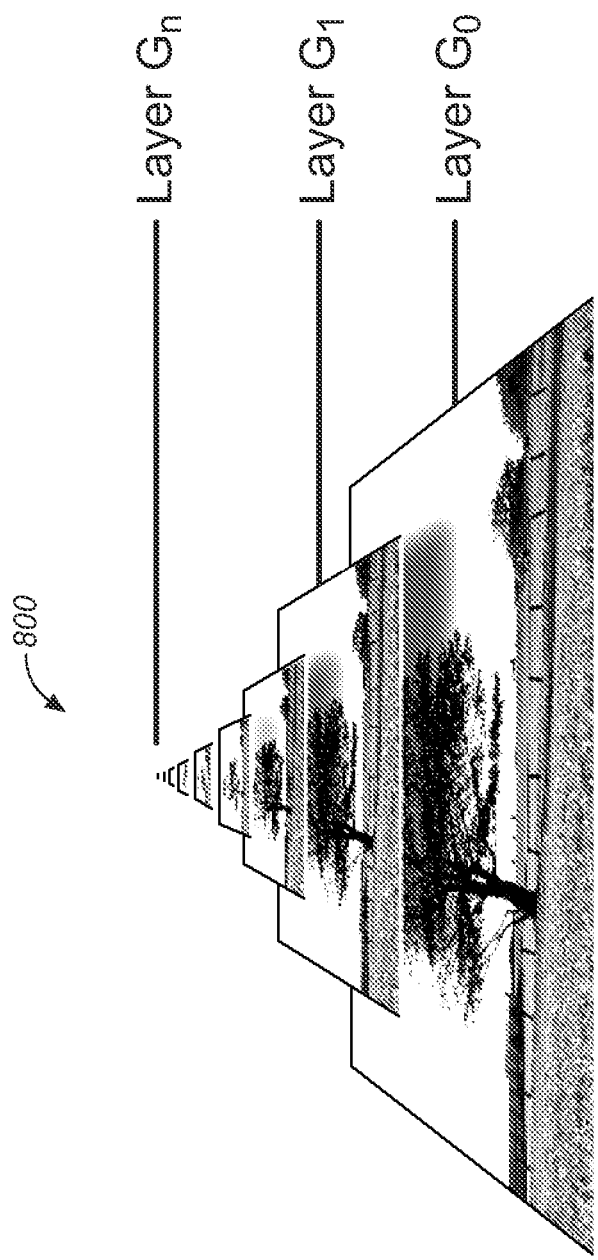
FIG. 8 depicts one embodiment of an efficient pyramid data structure for which metadata may be stored and accessed.

FIG. 8 depicts such a pyramidal structure 800 which is based on multilayer spatial subsampling on the x- and y-axis of an image. As may be seen, an original image may be a base layer—Layer $G_0$—in the process. Moving up processing steps, each new layer (e.g. Layer $G_1$ . . . Layer $G_n$) represents a level of encoding from which the underlying layers may be recovered. Using such spatial image pyramids, it is possible to compute image statistics for different spatial frequencies.

Figure 9:
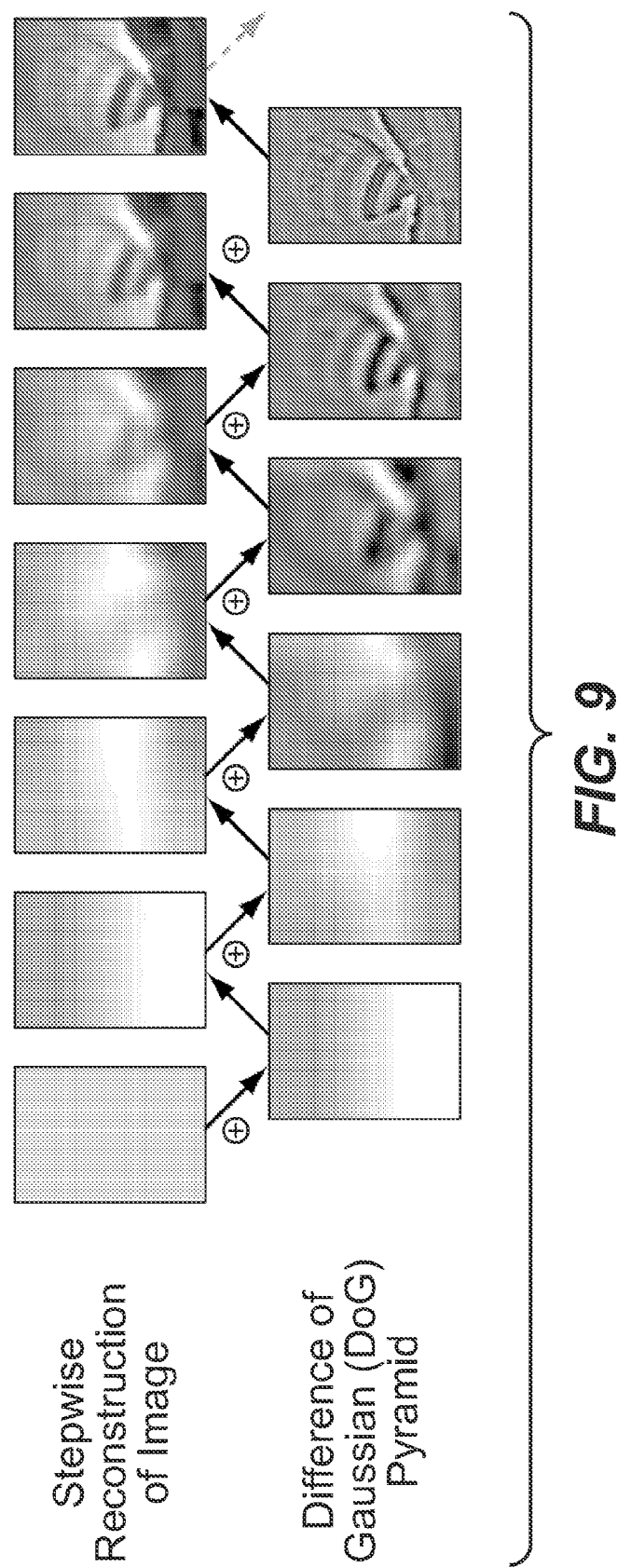
FIG. 9 depicts another embodiment of computing statistics based on a Difference of Gaussians.

An additional option is to compute statistics based on 'Difference of Gaussians' (DoG) images (spatial frequency band pass). FIG. 9 represents how one such pyramid is constructed using the DoG encoding. The top images represent the stepwise reconstruction of the image using the DoG pyramid.

The previously-mentioned statistical and the spatial analysis may also be combined in the form of multidimensional image pyramids. Beside the pyramids using spatial information (e.g., FIG. 8), it is possible to build histogram pyramids of (and from) other image parameters such as spatial frequency distribution, appearance correlates (lightness, chroma and hue, e.g., FIG. 4) and row and column histograms (also FIG. 4). This approach may also be extended on a temporal scale where a pyramid could comprise of levels describing statistics for the whole film, chapters, scenes, blocks and single frames (e.g., FIG. 5). An example scene showing min., mean and max. appearance correlates over time is depicted in FIG. 6.

Figure 10:
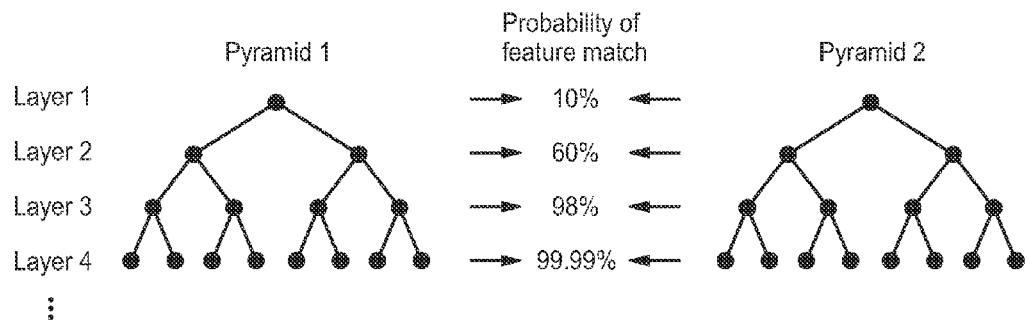
FIG. 10 depicts one embodiment of the use of one pyramidal metadata structure that may be used in comparison with metadata from another metadata structure.

FIG. 10 depicts the use of an efficient pyramidal structure of metadata—in the context of DRM application. Suppose a set of legacy source films has been previously analyzed for its relevant statistical features and stored in Pyramid 1 of FIG. 10. If a viewer/user is viewing a stream of video data (e.g. a set of test image data), such statistics may be computed on-the-fly and stored in its own associated structure—e.g., Pyramid 2. As Pyramid 2 is being built and/or populated, it would be possible to compare that pyramid (or a portion thereof, as it may be built and/or populated over time) against the database of previously stored pyramids. As is depicted in FIG. 10—and assuming the video stream is substantially the same that creates both Pyramid 1 and 2 (e.g., within the tolerance of possible different versions or degraded video content, as discussed further below), then if Pyramid 2 is a reasonably good match at Layer 1 for Pyramid 1, then a confidence of a match may be initially assessed (e.g. 10% probability of a match). As additional layers are computed for Pyramid 2 and matched against Pyramid 1, it may be seen that confidence levels for a match may go up substantially after only a few layers. If a match has a confidence within a certain threshold, then the system may decide whether the user has the rights to view such a stream (according to licenses, local laws of the user's country or geography or the like). In many cases, a confidence threshold may be reached before all of the pyramid steps have been computed and compared—thus, possibly reducing the computation and cost for this embodiment. FIG. 10 illustrates this possibility—e.g., the 99.99% threshold may be reached at layer 4 of this pyramid.

Figure 11:
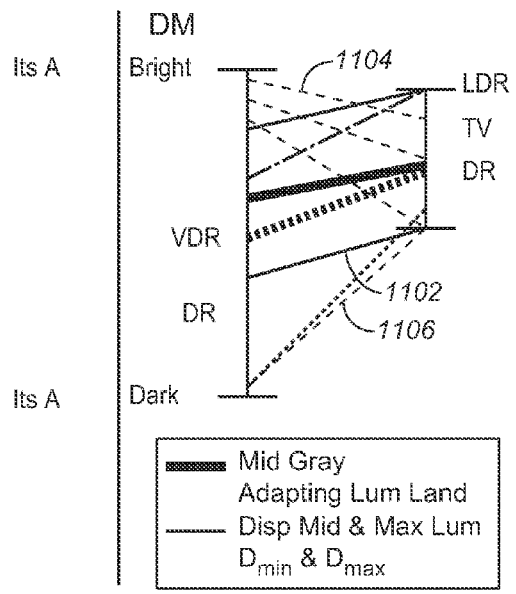
FIG. 11 depicts the use of video image metadata that may be used to for improved DM playback.

Other uses of this type of efficient metadata storage may be possible. For example, if a match of video content is made, then the metadata may be used for DM playback adjustment. As mentioned, such playback adjustment may also take into consideration the specifications and parameters of the viewer's display. FIG. 11 depicts one embodiment of DM processing. On the left hand side 1102 of FIG. 11, the metadata for the source video file is computed for luminance, color gamut and/or dynamic contrast. The right hand side 1104 of FIG. 11 depicts the performance range and/or limits of the target display (e.g. TV, computer monitor, movie screen or the like) for a similar specification, e.g., dynamic range, color gamut, luminance or the like. In one embodiment, the three solid lines (as depicted by 1106) give a mapping of the low to high-mid range (or global statistical average) of the source data as mapped to the substantially all of the target display's performance range. This may be desirable, for example, if the scenes being rendering are not utilizing very luminous images. However, during different parts or portions of the video stream, there may be scenes that are very bright (as depicted in the three dashed lines 1108). In this case, the high-to-mid range of the source data may be mapped to substantially all of the target display's performance range. It will be appreciated that these modes of rendering source image data onto the target display's performance range may be dynamic—depending upon the image and/or scene analysis.

Having these statistics allows the system and/or pipeline to adjust the playback of the video content to be best remapped into a new target image pipeline with different mapping properties or onto a target display as depicted in FIG. 11. Here, the input material which offers an extended dynamic range, e.g., due to being color graded on a professional studio monitor 1102 offers a wide range of possibilities on being mapped to a standard (e.g. consumer) display device 1104. The metadata provided by the statistics computed by metadata processor 202 may now be used in decision making to either use a mapping strategy such as 1106 (where an emphasis is on the darker image areas of the source) or 1108 (where a small highlight area is emphasized). This, of course, may not be limited to dynamic range compression. Such strategies may also be applied to gamut mapping strategies as well.

Film Editing and Restoration

Figure 12:
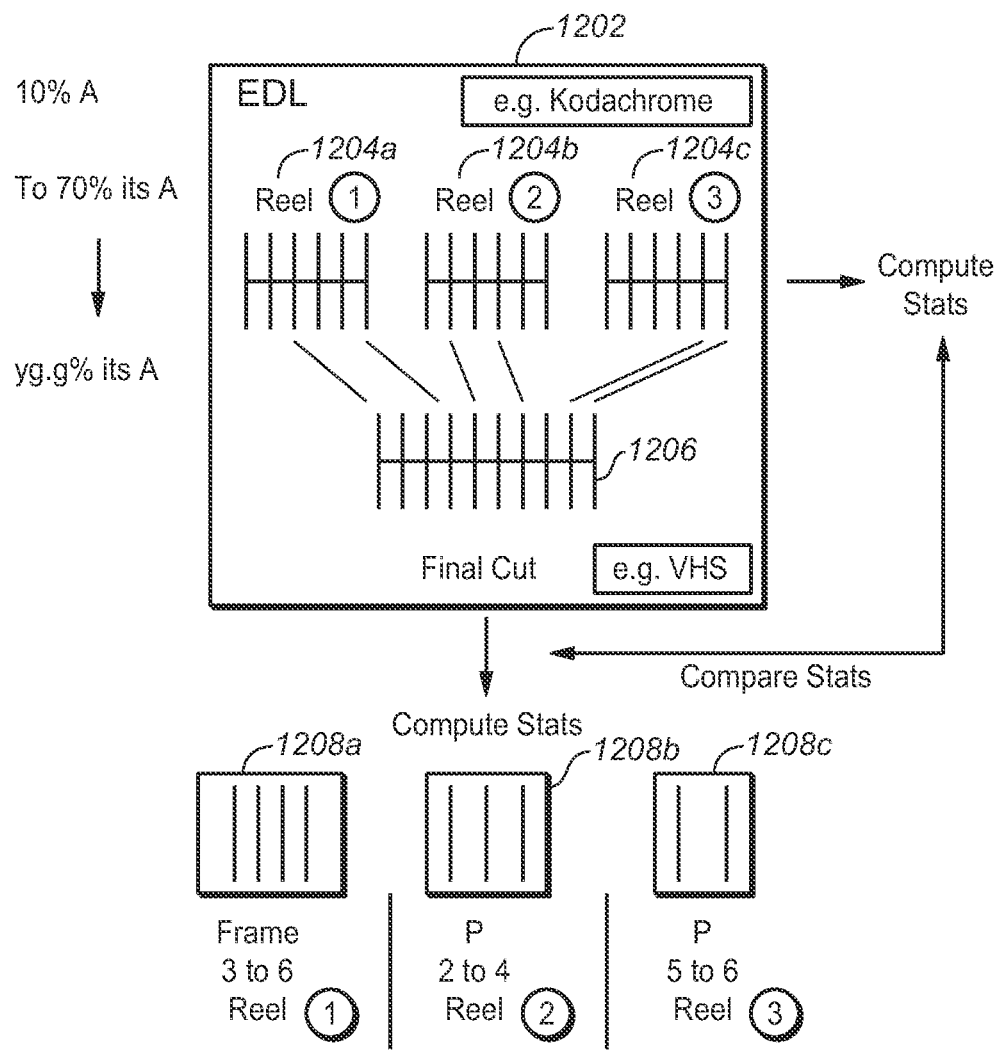
FIG. 12 depicts the use of video image metadata that may be used in the editing and/or restoration of films.

Another possible use of this type of efficient metadata storage and/or modeling may in the field of film editing and/or restoration. FIG. 12 depicts one embodiment of editing and/or restoration. Merely for expository reasons, assume that a final cut 1206 of a film was initially edited from three Reels 1, 2 and 3 (i.e., 1204a, 1204b and 1204c, respectively). Assume further that some portion of Reel 1 was used to create the opening sequence in the final cut 1206, some portion of Reel 2 was used to create the middle sequence in the final cut and some portion of Reel 3 was used to create the ending of the final cut. It may be further assumed that some years go by and the "master" final cut may become lost or degraded over time—but some version (perhaps on VHS) is available. Further, it may be assumed that Reels 1, 2 and 3 may exist—and it is desired to (re)-create a high quality final cut from some source material which may reflect the original final cut.

In this case, statistics may be computed from the source material (e.g., from Reels 1, 2 and 3)—either before the release of the final cut, or any time thereafter. Furthermore, the same sets of statistics may be computed for the available "final cut". These statistics would help to identify the frames of the source material that went into the final cut. When it is desired to recreate a final cut (or a variant thereof), the statistics may be used to compare some version of the final cut with the source material.

In one embodiment, an example workflow may be as given as in FIG. 12. Box 1202 may describe a typical edit process going from source reels (1204a to c) to a final cut 1208 using an Edit Decision List (EDL) 1206. Usually, multiple final cuts may be created—e.g., for different markets or geographical regions. If this editing process has been long in the past (e.g. decades ago), the EDL is usually not available anymore. However, the film reels are usually archived. Now, the final cut after distribution (1210) as well as the film reels out of the archive (1204a to c) may be statistically analyzed using the methods described in this present application—e.g., by using a pyramidal approach illustrated (as possibly shown in FIG. 10). One goal might be to identify matching frames on the present final cut 1210 and the film reels out of the archive 1204a to c to obtain a reconstructed EDL 1214 matching the original EDL 1206. This may still be possible, even if the existing final cut has been degraded (for example, if it is only present on analog video tape). The reels from the archive may now be recut (1216a to c) e.g. in high definition and/or higher dynamic range version using the reconstructed EDL.

Fault or Error Tolerant Processing

Further, if the whole movie is computationally accessible prior to streaming (or viewing by a customer), the statistics should be very robust. However, even if the video is to be broadcast to a user or a set of users, the confidence of the classifier should increase over a short period of time, allowing a robust identification of the current frame or scene.

An additional benefit of using a statistical approach is that frames can be identified—even when the movie or the scene is cut differently (e.g. for different countries or markets). This is where the pyramidal structure will be of use to identify alternative cuts. This can for example be carried out by comparing the different levels of each dimension of a pyramid and identify where the deviate from each other. This allows to 'home in' to the variations.

In one embodiment of the present application, the system should also be robust where only a SDR stream is available and determine the missing image parts that would be needed to reconstruct the full VDR stream. The amount of data needed for that (VDR–SDR=information to be transported) is likely to be less than transmitting the full VDR stream and could therefore for example be transported via a mobile Internet connection. In another embodiment, it is possible to create an on-the-fly VDR version of a DVD that the viewer already owns—for a fraction of the computational and storage (and possible actual, in dollars, or some other currency unit) cost of the full video. As the position of every frame in the video is potentially known, this approach should also be robust against different cuts or movie releases in different countries. Based on all this information, we can compute error statistics based classifiers. Beside of identifying individual frames, this information can also be compared e.g., to an online database. This database could for example be used to identify viewing preferences of consumers (e.g. identify which media, language version, cut, VDR/SDR, grading).

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A media processor for the creation of metadata from a set of images, said media processor comprising:
   an input for a first set of data, said first set of data comprising image data, metadata or image data/metadata associated with said set of images, said set of images comprising a sequence of images; and
   a metadata processor being capable of receiving said first set of data and computing a set of metadata from said first set of data, said set of metadata comprising statistical data derived from said sequence of images over a plurality of different temporal intervals and said set of metadata representing a media fingerprint which identifies said set of images without altering said set of images; and wherein
   said metadata processor is capable of generating and storing a multi-scale version of said set of metadata, said multi-scale version including first metadata generated based on statistical attributes associated with said sequence of images over a first temporal interval and second metadata generated based on statistical attributes associated with said sequence of images over a second temporal interval;
   said first temporal interval and said second temporal interval are associated with increasing levels of said multi-scale version of metadata; and
   each increasing level of said multi-scale version of metadata is associated with an increasing confidence level in said media fingerprint;
   said set of metadata further comprises at least one of statistical attributes derived directly from said first set of data and statistical attributes derived from image appearance correlates of said first set of data;
   said media processor is further capable of performing display management (DM) processing of a set of image data to be rendered on a target display having a set of display specifications; and
   to perform said DM processing, said media processor is operative to compute a first set of statistics from said set of image data over time,
      compare a portion of said first set of statistics against said set of display specifications,
      test for a match condition for said portion of said first set of statistics against said set of display specifications, and
      render a portion of said set of image data upon said target display, said target display comprising said set of display specifications.

2. The media processor as recited in claim 1 wherein said statistical attributes are selected from the group consisting of mean, variance, skewness, kurtosis, statistical moments, histograms, image pyramids, edges, gradients, framerate, resolution and bit depth.

3. The media processor as recited in claim 1 wherein said multi-scale version comprises a subsampled set of said set of metadata wherein said subsampled set of said set of metadata is stored in a data structure.

4. The media processor as recited in claim 3 wherein said data structure comprises a pyramidal structure or a multi-scale structure.

5. The media processor as recited in claim 4 wherein said pyramidal structure comprises pyramids of data derived from temporal image information or pyramids derived from spatial-temporal image information.

6. The media processor as recited in claim 5 wherein said media processor comprises a DM processor, a digital rights management (DRM) processor, a compression processor, a tone mapping (TM) processor, a color appearance (CAM) processor, or a Gamut Mapping processor.

7. The media processor as recited in claim 5 wherein:
said media processor is further capable of performing digital rights management (DRM) processing on a set of test image data against a first pyramid structure derived from a second set of statistics compiled from a legacy set of image data; and
to perform said DRM processing, said media processor is further operative to compute a third set of statistics from said test image data over time,
derive a test pyramid structure from said third set of statistics from said test image data over time,
compare a portion of said test pyramid structure against said first pyramid structure,
test for a match condition from said comparison of said portion of said test pyramid structure against said first pyramid structure, and
return said match condition when said test determines a match within a given threshold.

8. The media processor as recited in claim 7 wherein said media processor is operative to determine the identity of a source film from which said test image data belongs.

9. The media processor as recited in claim 1 wherein to compute said first set of statistics said media processor is operative to compute dynamic range or color gamut of said set of image data over time.

10. The media processor as recited in claim 9 wherein said set of display specifications comprises the dynamic range of said target display or the color gamut of said target display.

11. The media processor as recited in claim 10 wherein said media processor is further operative to test for a match of the dynamic range of a scene of a video with the dynamic range of said target display or the color gamut of a scene of a video with the color gamut of said target display.

12. The media processor as recited in claim 11 wherein said scene at the dynamic range of said video is rendered upon the target display.

13. The media processor as recited in claim 1 wherein:
said media processor is further capable of restoring a master cut of a film, said film derived from a set of source reels and a degraded version; and
to restore said master cut, said media processor is operative to
compute a second set of statistics from said source reels,
compute a third set of statistics from said degraded version,
identify frames from said source reels that comprise frames from said degraded version, and
create a master cut of said film from the frames identified from said source reels.

14. The media processor as recited in claim 13 wherein to create said master cut of said film said media processor is further operative to create an edit decision list (EDL) for said master cut.

15. The media processor as recited in claim 1, wherein said first time interval and said second time interval overlap.

16. The media processor as recited in claim 1, wherein one of said first time interval and said second time interval is included within the other of said first time interval and said second time interval.

17. The media processor as recited in claim 1, wherein said first metadata is generated using values from at least two frames of image data from said sequence of images over said first temporal interval.

18. The media processor as recited in claim 1, wherein said media processor is a component of a consumer endpoint device.

19. A media processor for the creation of metadata from a set of images, said media processor comprising:
an input for source data associated with said set of images, said set of images comprising a sequence of images; and
a metadata processor operative to
receive said source data,
generate first metadata based on statistics of said sequence of images associated with a first temporal interval,
generate second metadata based on statistics of said sequence of images associated with a second temporal interval, said second temporal interval being different than said first temporal interval such that said first metadata and said second metadata are derived based on different amounts of said source data, and
generate a multi-scale version of metadata based on said first metadata and said second metadata, said multi-scale version of said metadata representing a media fingerprint which identifies said set of images without altering said set of images; and wherein
said first temporal interval and said second temporal interval are associated with increasing levels of said multi-scale version of metadata; and
each increasing level of said multi-scale version of metadata is associated with an increasing confidence level in said media fingerprint.

20. The media processor of claim 19, wherein said media processor is further operative to:
generate third metadata associated with a first spatial frequency and based on said source data; and
generate said multi-scale version of metadata based on said first metadata, said second metadata, and said third metadata.

* * * * *